Nov. 6, 1962 J. C. HAYES 3,062,753
METHOD OF EXFOLIATING VERMICULITE
Filed Oct. 1, 1958

INVENTOR.
John C. Hayes,
BY
Brown, Jackson, Boettcher & Bremer
Attys.

United States Patent Office 3,062,753
Patented Nov. 6, 1962

3,062,753
METHOD OF EXFOLIATING VERMICULITE
John C. Hayes, Palatine, Ill., assignor to Zonolite Company, Chicago, Ill., a corporation of Montana
Filed Oct. 1, 1958, Ser. No. 764,709
13 Claims. (Cl. 252—378)

This invention relates to a process of treating vermiculite or vermiculite ores to improve the exfoliation characteristics thereof.

Vermiculite is a micaceous mineral, chemically identified as a hydrated magnesium-aluminum-iron silicate and characterized by a platelet structure which exfoliates or expands when heated or subjected to various chemical treatments so as to be increased to several times its original size and trap within itself thousands of minutely sized air cells. The mineral occurs naturally in an unexpanded state, and is mined in conventional manner.

Since vermiculite as it is mined in the form of vermiculite ore is associated with other minerals as impurities, the crude vermiculite ore, after being reduced to particle size, has generally been beneficiated by various concentrating methods well known in the art wherein the gangue material is separated from the vermiculite particles as much as possible, the vermiculite screened into a number of component sizes and the vermiculite heated at elevated temperatures until exfoliation occurs.

It has been an important goal for many years to find a means and method of increasing the yield of exfoliated product from a given amount of vermiculite ore and in this attempt, many methods—not entirely successful—have involved such processing techniques as increasing temperature and/or varying conditions and times of exposure of the unexpanded vermiculite to these temperatures.

I, however, have found that superior yields as well as an improved exfoliated product having a lower bulk density, a more nearly cubic shape, a more uniform finer pore structure, a lighter color, and lower K factor (thermal conductivity) can be achieved if the unexpanded vermiculite particles are first osmotically swelled by treating in a saturated or near saturated solution of an appropriate electrolyte, such as an aqueous solution of sodium chloride and then rinsed in fresh water so as to induce swelling and adsorption of moisture beyond its normal content. I have found that such swelled and moisture-containing vermiculite particles, when subsequently heated at elevated temperatures not only show improved volume yields up to and exceeding 125% of yields from heating unexpanded vermiculite not so treated but that also marked improvement in volume yields may be obtained when the thus treated vermiculite is subjected to lower temperatures than previously assumed essential in thermal exfoliation.

Although the mechanism of the swelling action is not completely understood, it is believed to be centered around the fact that the interstitial space between bundles of parcels or platelets of which unexpanded vermiculite is composed is originally either completely free of, or contains less than, the amount of absorbed water needed for complete saturaition of the particle or flake. When the flakes are contacted with a solution containing the dissolved electrolytes such as the aforementioned sodium chloride solution, the solution tends to penetrate into the flakes and saturate the interstices. As fresh water is subsequently added to replace the solution, a concentration gradient between the inside and outside of the gross flakes is set up. The fact that swelling results indicates that fresh water migrates into the flakes faster than ions from the electrolyte can diffuse out, both actions resulting from a concentration equalization tendency characteristic of solutions, and which action is termed osmotic in nature. In any event I have found that the swelling phenomenon does not result from soaking in fresh water alone, and furthermore I have established that it is essential to start with strong concentrations of the electrolyte and to follow by rinsing the saline treated vermiculite particles with fresh water. In those instances when I have begun with initially dilute solutions, or did not follow the saline treatment with rinsing, the desired swelling effect with subsequent increased yields of exfoliated vermiculite on heating did not take place.

Thus a first and general object of the present invention is to provide new and improved means and method of processing vermiculite to reduce the bulk density of the exfoliated product and simultaneously increase the expected volume yields of thermally exfoliated product from a given amount of unexpanded vermiculite ore.

A more specific object of the invention is to so pretreat the vermicuilte and/or its ores prior to the heating step in an exfoliation process whereby the unexpanded vermiculite will be more susceptible to expanding or exfoliating when subjected to heat at elevated temperatures.

Still another object of the invention is to provide means and methods of pre-treating unexpanded vermiculite and its ores whereby relatively lower temperatures may be used for the exfoliation step while obtaining the same or improved volume yields of the exfoliated product.

A further object of the invention is to osmotically swell unexpanded vermiculite as a condition precedent to the step of exfoliating the vermiculite by heating at elevated temperatures.

Another object of the invention is to increase the water content of the unexpanded vermiculite just prior to its being heated to the temperature at which exfoliation occurs.

Still another object is to increase the volume yield of exfoliated vermiculite from its unexpanded form by initially contacting the unexpanded vermiculite with a concentrated saline solution, such as of sodium chloride or other electrolyte so as to induce swelling by absorption of moisture and subsequently adjusting the moisture content of the swelled vermiculite and heating the adjusted moisture-containing swelled vermiculite to a temperature at which exfoliation occurs.

Still another object of the invention is to provide an exfoliated vermiculite of relatively low bulk density, lower thermal conductivity and more uniform pore structure.

A further object of the invention is to produce an exfoliated vermiculite having new and different chemical and physical properties in addition to lower bulk density by swelling unexpanded vermiculite isothermally by a mechanism that appears to be osmotic in nature and which is followed by thermal treatment to produce exfoliation.

Many and further objects of the invention as well as advantages and features thereof will be apparent from the discussion of the invention which follows, and it will be understood moreover, in said discussion which more specifically describes the invention, that the same is not to be taken in a limiting sense but merely as illustrative of the invention, the metes and bounds of what is to be considered patentable therein being defined by the appended claims.

Figure 1:
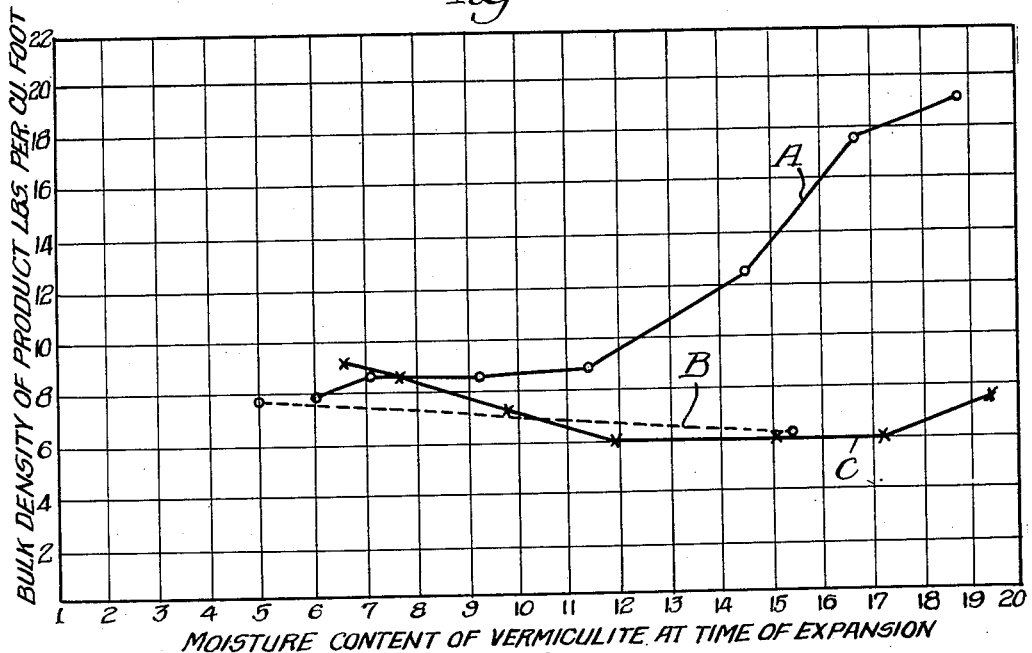
FIGURE 1 illustrates graphically a comparison of salt-treated and untreated vermiculite samples as a function of added moisture content when exfoliated in a furnace temperature of 1000° F.
Figure 2:
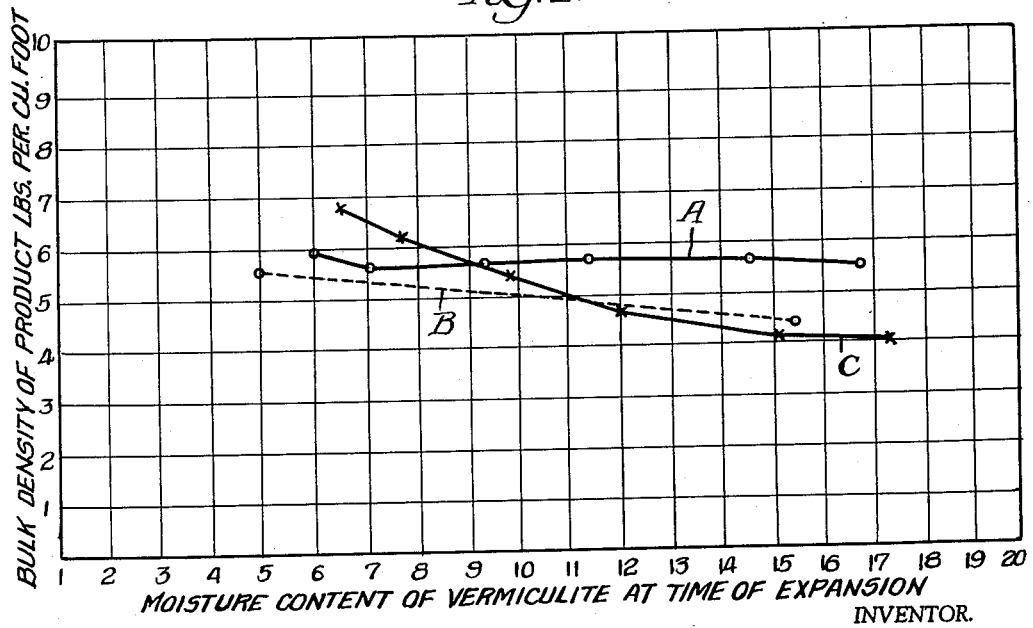
FIGURE 2 illustrates graphically a comparison when salt-treated and untreated vermiculite flakes are exfoliated at a furnace temperature of 100° F.

Conventionally, vermiculite ore is milled to the desired particle size and beneficiated by one of several known classification processes to remove gangue and other foreign material. The unexpanded particles of vermiculite from said classification stage are graded as to size and heated at a furnace temperature between 1300° and 2000° F. until exfoliation occurs. With improved furnace design exfoliation can be conducted effectively at furnace temperatures even as high as 3000° F.

However, in the practice of my invention, before heating the particles to exfoliation temperature, I propose to immerse the vermiculite particles or flakes in a strong, and preferably saturated, solution of an electrolyte such as sodium chloride or other alkali or alkaline earth salt for a time period which is sufficient to obtain penetration of the saline solution within the vermiculite flakes. This may vary from an hour to several days in accordance with the size of particles and/or batch being treated.

Where the electrolyte comprises sodium chloride, I have found that raising the temperature of the solution above room temperature has little effect. However, when I have used solutions of other electrolytes, notably calcium chloride, I have noted substantial improvement and that the operation can be considerably speeded up, if the saturated solution of calcium chloride is heated to approximately 150° F. Examples of other saline solutions that may be used include aqueous solutions of lithium chloride, potassium chloride, calcium chloride, magnesium sulfate and aluminum sulfate. Salts of barium and potassium are also useful as the electrolyte altho I have found the amount of swelling they promote to be less than when using electrolytes such as the aforementioned sodium or calcium chloride. Also water miscible liquids such as glycerine and aqueous solutions of nonpolar molecules such as dextrose and glucose can be used in place of the brine.

The salt treated vermiculite flakes are subsequently rinsed in repeated washings of fresh water until the washings give no indication of salinity, i.e. until all of the excess salt not penetrating the vermiculite particle structures has been removed. We have found that the rate of swelling can be greatly accelerated if hot water is used for washing and the rinsed vermiculite particles are allowed to stand in the heated water for a short time after rinsing. For example, it was found that when samples of vermiculite had been immersed for two hours in a saturated sodium chloride solution in water, the following rates of swelling were obtained using water heated to the two indicated temperatures for the rinsing and soaking steps:

*Table A*

| Wash and Soak Water Temperature | Percent Swelling After— | | |
|---|---|---|---|
| | 10 min. | 30 min. | 1 hour |
| 73° F. (Room Temp.) | 12 | 16.5 | 20 |
| 150° F. | 24 | 41.5 | 54 |

That some amount of the sodium ion is retained in the flakes as a result of the aforesaid treatment, is evidenced by an approximately 0.5% increase in weight the flakes undergo, which has been measured under conditions controlled to accurately compensate for any increase in weight due to adsorption of water.

Preferably, the step of rinsing is followed by soaking the vermiculite particles in fresh water at which stage the immersed vermiculite will absorb from one to four times its weight of water. Usually thirty minutes or so will suffice for the soaking step dependent on the size of particles and batches being treated.

If desired, the rinsing step may be omitted and fresh water added to the brine in large enough quantity to dilute the salt solution and until a maximum amount of moisture has been adsorbed by the vermiculite particles. However, since the degree of swelling is a function of the difference existing between the concentration of solute inside the particles and the concentration thereof outside the particles, it is preferable to start with a saturated solution of electrolyte and then to rinse to remove the excess electrolyte so as to have the greatest possible concentration differential. Moreover from a point of economy in practising the process, it is highly desirable to recover as much of the unconsumed salt as is practicable.

The swelled vermiculite can then be dried until its moisture content has been lowered to within the range of 10 to 50% by weight of the vermiculite on a dry basis [1] which I have found most desirable for thermal expansion. Alternatively, from a point of economics, I have found it preferable to dry the swelled vermiculite as much as possible so as to reduce its moisture content to a minimum. Because of the bulk factor involved it has been found more practical to locate the exfoliating furnaces near the consumer rather than at the supply source which may be many hundreds of miles apart. The swelled but dried vermiculite can obviously be shipped more economically than the exfoliated product. At the expanding plant, the vermiculite can then be rewet with water before being added to the exfoliation furnace, in order to raise its moisture content to within the desired range of 10 to 50%. It is particularly significant that the dried osmotically processed vermiculite can be rewet to advantage, as re-wetting of unprocessed vermiculite does not give the same results and in some instances has been noted to inhibit expansion in the exfoliation furnace. The thus swollen and moisture-containing vermiculite is then added to the furnace and subjected to elevated temperatures until exfoliation occurs which may be a matter of a few seconds or less dependent on the particular furnace being used.

The role of the initial salt treatment in the osmotic treatment of the vermiculite was dramatically shown in an experiment conducted using vermiculite flake concentrates of a No. 2 grade of vermiculite ore taken from deposits at Libby, Montana. The concentrate was divided into three parts. One portion was treated with a saturated solution of sodium chloride. The second was treated with a saturated solution of magnesium chloride and the third, as a control, was kept free of all salt. The first two portions were soaked in the respective saturated salt solutions for about a week to assure maximum penetration, then washed with fresh water until the washings were free of salinity, and dried to an equilibrium at 50% R.H. prior to use. Extra moisture, in measured quantities was added to 100 gram portions of each sample, and the moistened flakes were then stored in sealed containers for 72 hours until time for thermal expansion. Expansions of the flakes from each container were conducted at two furnace temperatures, 1000° F. and 1800° F., using a laboratory globar type furnace. Two furnace temperatures were used in order to minimize the possibility of drawing a conclusion that would be true for only one particular set of expanding conditions. The water or moisture content of each sample was then determined by oven drying (110° C.) companion samples to equilibrium. The bulk density of the thermally exfoliated products was measured and the results are shown in FIGURES 1 (furnace temperature at 1000° F.) and 2 (furnace temperature at 1800° F.). Curve A represents the control or flakes which were not treated with salt; while curve B represents flakes treated with magnesium chloride, and curve C that treated with sodium chloride, and which curves have been plotted to show bulk density in pounds per cubic foot against moisture content of the treated vermiculite samples. In said figures, the indicated moisture contents are based on the dry weights of each sample, and include the moisture naturally present at 50% R.H. plus the amount of water added prior to expansion.

As will be seen from an inspection of the data presented by these figures, no significant benefit was derived from the mere addition of water without the salt treatment, even though 72 hours were allowed for penetration of ---
[1] E.g. drying at 105° C. to equilibrium.

water. Treatment of the samples with sodium chloride solutions prior to expansion, however, led to a decided benefit at both furnace temperatures, providing also that the moisture content added to the sample was equal to at least 10% by weight of the sample. Magnesium chloride was equally as effective as the sodium chloride. These tests bring out not only that increased exfoliation is characteristic of salt treated vermiculite under those conditions where additonal amounts of moisture are present; but the tests also demonstrate that the salt treatment establishes a means for introducing said excess moisture into the interior regions of the vermiculite flake structure where it can exert a significant and beneficial effect on the exfoliation property of the vermiculite flakes.

Although the afore-described experiments were conducted using saline soltuion of magnesium and sodium chlorides, the relative swelling effects of the various other alkali salts have also been demonstrated. In further experiments, beds of vermiculite representing both Libby, Montana, and Palbora, South Africa, deposits contained in glass columns were contacted with saturated solutions of sodium chloride, potassium chloride and lithium chloride for a period of several days, and then washed with fresh water. Swelling of the vermiculite beds was observed to commence almost immediately in each instance after the flakes become contacted with fresh water and to continue at a constantly diminishing rate thereafter until a maximum swelling was achieved. The lithium salt treatment exhibited the greatest increase in volume, about tenfold. With potassium salt, the swelling was approximately threefold, and with sodium salt, the increase noted was approximately sixfold.

Through X-ray diffraction and observation of nitrogen adsorption of the treated vermiculite, it has been concluded that the swelling which results is not intra-micellar, that is, the individual platelets or parcels of the vermiculite are not themselves expanded; but rather the expansion takes place between the bundles of parcels, and thus is more correctly termed as inter-micellular. This is further substantiated by the fact that when vermiculite has been previously ground to about 100–200 mesh size, there is no tendency for particles of this size to swell with the electrolyte treatment. Presumably, the vermiculite has in such instances been reduced to a particle size range which either approaches the size range of the bundles of parcels or at least to a size that approaches the median size of the discontinuities between individual bundles and that it is in these regions where the swelling forces originate.

However, in all instances working with particles larger than —100 mesh size substantial benefit by way of increased volume yield and reduced bulk density of the exfoliated product has been obtained. When working with vermiculite ore concentrates up to 8 and including 10 mesh size, where the moisture content of the concentrate is adjusted to be in excess of 10% of the weight of the vermiculite batch at the time of expansion, yields from such concentrates have been found to represent an average increase of from 20% to 25% in excess of the yield which is expected from untreated concentrates. Furthermore, when the treated vermiculite was subjected to temperatures as low as 1000° F., results were obtained comparable to that of untreated vermiculite which had been exfoliated at higher more conventional temperatures.

Particularly when working with the coarser grades of vermiculite particles, as of a mesh size greater than —8, further improvement in volume yield per cubic foot of unexpanded ore has been found possible if the particles are subjected to a partial mechanical delamination prior to the salt swelling step which is sufficient to render them thin enough to be transparent.

Sodium chloride is possibly the electrolyte of choice for use in the osmotic treatment of the vermiculite flakes, primarily because of its availability in large supply and low cost. However, there are several distinctive advantages attendant in the use of calcium chloride as the electrolyte. For one, calcium chloride itself is considerably more soluble in water than sodium chloride as is indicated in the following:

Table B

| Salt | Percent Salt in Saturated Solution | |
|---|---|---|
| | at 25° C. | at 100° C. |
| Sodium chloride | 26.5 | 28.5 |
| Calcium chloride | 45.0 | 61.0 |

Thus it has been found that if the vermiculite flakes are immersed in a saturated solution of calcium chloride at about 100° C. for as brief a period as 3 to 5 minutes and then followed by washing and soaking in fresh water maintained at about 150° F., substantial swelling of the particles will result within a period of 15 to 30 minutes. This compares favorably with the minimum time of brining with sodium chloride solutions to produce reasonable latent swelling which is in the order of two hours. Although it is possible to induce a small degree of swelling with vermiculite by brining in saturated sodium chloride solutions for periods as brief as 5 minutes, the amount of swelling achievable is small compared to that which can be obtained using calcium chloride solutions for comparable lengths of time. With sodium chloride, temperature of the brine solution has very little effect on the overall results. However, with calcium chloride, the situation appears to be quite different in that warm or even hot saturated solutions thereof seem to produce in a given length of time considerably more latent swelling capacity than do solutions held at cool or room temperature. The difference in behavior between the two salts in this respect is probably due to their different solubility characteristics.

In thermally expanding the salt treated vermiculite particles, strong fumes of hydrochloride acid have been noted as escaping from the furnace. The amount has been determined by actual measurement in the laboratory to correspond molecularly with the amount of sodium chloride which apparently is deposited within the vermiculite flakes during the described osmotic swelling process. The hydrochloric acid is apparently formed by hydrolysis of the chloride salt aided by the high volatility of the hydrogen chloride and is consequent to some chemical reaction involving base exchange. It appears quite clear that no free acid or free salt remains in the exfoliated vermiculite since all of the chlorine ions are released as escaping acid fumes while the sodium ions remain and enter into surface reactions with the vermiculite to form complexes therewith.

The hydrogen chloride which is formed, as above described, may be collected by conventional means to result in low cost, easily recoverable hydrochloric acid. The yield of hydrochloric acid can be increased by allowing larger amounts of residual salt to remain on the vermiculite prior to expansion.

Precisely what part the osmotic treatment plays in exfoliation is not clear. Suffice it is to say that whatever happens to the vermiculite during the osmotic processing happens quite automatically. Conceivably there may be some slight amount of partial delamination either as a direct result of the swelling action and possibly in part by reason of the mild handling the particles receive during the various steps of brining and rinsing. Particularly in the case of larger sized flakes, exceeding —10 mesh, a greater capacity for delamination has been noted and the swollen flakes may be split or cleaved into thinner flakes with relative ease.

As far as exfoliation is concerned it is highly desirable to produce thin flakes with a minimum fracturing in planes normal to the plane of cleavage. As in thermal exfoliation, osmotic swelling of vermiculite has been found to constitute a uni-dimensional effect and no appreciable change in cross-sectional area is seen to occur. Thus swelling tends to accentuate cleavage tendencies without causing any direct weakening of the particles along its other axes. Furthermore, the swelling has not been found to induce fracture except insofar as inherent weaknesses within sheets become exposed to outside forces as distention occurs. Finally, any limited fracturing that occurs is more than compensated by the considerable increase or gain in expanded volume and consequent lowering of bulk density.

Thus it has been found that with concentrates which would normally yield products weighing 8 to 10 pounds per cubic foot when thermally exfoliated from a nonexpanded condition gave products when treated with salt according to the present invention consistently in the 3.5 to 6.0 pounds per cubic foot range. This promotes the possibility of obtaining 80 to 90 bags of the exfoliated product per ton of concentrate from concentrates which would under the old method yield only 45 bags. The ability to increase the yield of concentrates is also important because it has been found that the osmotically treated vermiculite particles, when thermally expanded, resulted in a 20% reduction in K factor (the thermal conductivity of the exfoliated vermiculite when expressed in B.t.u. per square foot per hour, per Fahrenheit degree for a thickness of 1 inch). For example, vermiculite ore of a particular grade was salt treated according to the invention and thermally exfoliated to have a bulk density of 4 pounds per cubic foot. Its K factor was found to be 0.35 which compared with a K factor of 0.48 obtained for a similar particle sized batch of vermiculite which was thermally exfoliated at the same temperature but which has not been salt treated.

Treatment of the unexpanded vermiculite in this manner however, does not appear to significantly affect its mesh size. Thus, in a further example, 10 pounds of crude vermiculite determined to have a mesh size of −16+50 was immersed in a saturated sodium chloride brine. After standing over night, the brine was drained and the vermiculite washed ten times with clear water. The vermiculite was then allowed to stand in a large excess of fresh water. The bed of vermiculite expanded about twofold during the succeeding twenty-four hours. The vermiculite was then separated from rock by passing it through a simple hydraulic separator. Thereafter the vermiculite was drained, dried to a 50% moisture and expanded in a vertical electric furnace heated to 1800 degrees Fahrenheit. The resultant expanded or exfoliated vermiculite had a loose fill bulk density of 3.5 lbs./cu. ft. and a K factor of 0.343. When measured, its sieve analysis was still −16+50.

The following table indicates the range of bulk density and K factor that can be obtained for the usual or commercial grades of vermiculite when osmotically processed and expanded according to the invention.

*Table C*

| Mesh Size | Bulk Density | K Factor |
| --- | --- | --- |
| −¾+16 | 3.5 to 5.0 | 0.3 to 0.5 |
| −4+30 | 3.5 to 6.0 | 0.3 to 0.5 |
| −8+100 | 4.0 to 8.0 | 0.3 to 0.5 |
| −16+100 | 4.0 to 10.0 | 0.3 to 0.5 |

Such osmotically processed products are better thermal insulators than thermally exfoliated vermiculite particles of the same mesh size which have not been osmotically treated, not only because of the possible lower bulk density and lower K factor but also because the thermal expansion of osmotically processed vermiculite tends to give a product which consists of short "blocky" granules of exfoliated vermiculite. That is to say they are more nearly cubic in shape as compared to the extended "worm-like" granules characteristic of the prior art exfoliating processes.

The original vermiculite ore particles comprise rough fragments with rounded corners and range in shape from approximately square pieces with broken corners, to rectangular pieces with broken corners, to more nearly kidney-shaped particles. On exfoliation they form cylinders of more or less the same cross section as their original shape. However vermiculite particles salt processed according to the present invention tend to expand into granules wherein their length is comparable to the diameter of the particles as measured in the plane of the original unexpanded particles, thus the "blocky" descriptive term. On the other hand untreated particles expand into relatively long "worms," the length of which will be several times their cross section. Particles having a length 5 to 20 times their diameter were not uncommon.

The "blocky" granules produced in accordance with the present invention tend to close-pack better than the "worm-like" particles due to a minimizing of tendencies to "bridge." The close packing leads to a more uniform distribution of inter-particles pores and more uniformly sized dead air spaces, a desirable factor in thermal insulating materials.

Furthermore, transmission of heat is an isotropic in expanded vermiculite, that is to say the rate of heat conduction is much less in a direction normal to the plane of cleavage than it is in directions parallel to cleavage planes, due to differences in degree of continuity of the solid material comprising the particles. Consequently with the "blocky" granules obtained by osmotic processing, there is a greater statistical opportunity to achieve a proper orientation of particles so as to minimize the rate of heat flow through a thickness of said particles.

Furthermore, the pore size distribution within the expanded particles has been found to be more uniform where the concentrates are prepared by an osmotic treatment. There are fewer large pores and an increased number of finer pores within the individual particles. This characteristic of the exfoliated particles also helps to decrease the rate of heat flow therethrough wherefor one of the important uses for vermiculite processed according to the present invention will lie in the insulating field. This finer pore size as well as more uniform pore distribution is also of significance in the improved ability the vermiculite has to absorb various liquids and which absorbant feature may be taken advantage of in many ways, as for example as a carrier of various chemicals, insecticide, etc.

The large number of fine pores in the exfoliated osmotically produced vermiculite also results in thinner sections of solid material between pores so that the granules have a lighter more golden color which is not only psychologically more acceptable but also has the advantage that lower amounts of pigmenting material are required in mixture therewith for equal coloration or whiteness.

Thus all of the objects and advantages of the invention have been described as obtainable in a convenient, simple and practical manner.

Having described my invention I claim:

1. In a process of exfoliating vermiculite which involves heating the vermiculite in flake form at elevated temperatures, the steps of subjecting the vermiculite flakes to a saturated saline aqueous solution for a time interval sufficient to deposit a quantity of salt within and between the micelles of which the vermiculite flakes are comprised, then rinsing to remove excess salt and soaking in water for a time interval sufficient to swell the flakes, drying the flakes to permit convenient handling and subsequently contacting the vermiculite flakes with water so that at the time of heating they will contain a controlled amount of moisture beyond the normal moisture content of the vermiculite in addition to a residual amount of salt.

2. The process of claim 1, wherein the residual amount of salt is equal to at least 0.5% by weight of the vermiculite.

3. A method of exfoliating vermiculite comprising the steps of causing the vermiculite to adsorb water by first treating the same with a strongly-concentrated saline aqueous solution and subsequently rinsing the treated vermiculite with fresh water until swelling occurs, adjusting the water content of the vermiculite ore above its normal content, and thereafter heating the water-adsorbed swollen vermiculite to a temperature at which exfoliation occurs.

4. A method of exfoliating vermiculite comprising the steps of contacting the vermiculite particles with a strong saline aqueous solution until the saline solution penetrates the vermiculite particles, washing with fresh water until swelling of the vermiculite occurs, adjusting the moisture content of the swelled vermiculite so that it is equal to at least 10% by weight of the vermiculite, then heating the swollen and moisture-containing vermiculite to a temperature at which exfoliation occurs.

5. A method of exfoliating vermiculite comprising the steps of contacting the vermiculite with a saturated saline aqueous solution for a time interval sufficient to obtain penetration of the vermiculite with salt from said solution, then adding moisture to the salt penetrated vermiculite until swelling occurs, and heating the treated vermiculite to a temperature at which exfoliation occurs.

6. A method of exfoliating vermiculite of particle size larger than −100 mesh comprising the steps of contacting said particles with a near saturated saline solution which will induce osmotic swelling on penetration of the particles with the solution, maintaining contact of the particles with said solution until penetration thereof by the solution is obtained, then adding moisture until swelling occurs and substantially adjusting the moisture content of said particles to be equal to from about 10 to 50% of the particle weight, then heating the particles to a temperature at which exfoliation occurs.

7. The method of claim 6 wherein the saline solution is saturated.

8. The method of claim 6 wherein swelling is continued until the particles have increased at least onefold in volume.

9. The method of claim 6 wherein the particles are exfoliated at temperatures between about 1000° F. and 3000° F.

10. A method of exfoliating vermiculite which comprises the steps of contacting the vermiculite in particle form with a heated near saturated solution of calcium chloride in water to accomplish penetration of the particles with calcium chloride, then adding moisture sufficient to induce swelling, drying the particles, subsequently causing adsorption of moisture by the particles equal to at least 10% by weight of the vermiculite, and heating the particles to a temperature at which exfoliation occurs.

11. The method of claim 10 in which the particles are swelled by rinsing in fresh water heated to near 150° F. and are subsequently soaked in similarly heated fresh water until swelling occurs.

12. A method of exfoliating vermiculite comprising the steps of immersing particles of vermiculite of larger mesh size than −100 in a strong solution of sodium chloride in water until penetration of the particles with sodium chloride is obtained, then diluting the solution with fresh water to induce swelling of the particles, adjusting the moisture content of the particles to at least 10% by weight and heating the thus swelled particles of vermiculite to a temperature at which exfoliation occurs.

13. A method of exfoliating vermiculite comprising osmotically swelling the vermiculite by contacting it with an aqueous solution of glucose whereby the said solution penetrates the vermiculite so as to introduce a concentration gradient between the inside and outside of the vermiculite when afterwards the vermiculite is contacted with fresh water, allowing the contacted vermiculite to adsorb water and thereafter subjecting the osmotically swollen vermiculite to a temperature at which exfoliation occurs.

References Cited in the file of this patent

UNITED STATES PATENTS

| | | |
|---|---|---|
| 1,972,390 | Miner | Sept. 4, 1934 |
| 2,531,975 | Essex et al. | Nov. 28, 1950 |
| 2,898,303 | Houston | Aug. 4, 1959 |